(12) United States Patent
Cariello et al.

(10) Patent No.: US 12,132,832 B2
(45) Date of Patent: Oct. 29, 2024

(54) SECURE KEY UPDATE FOR REPLAY PROTECTED MEMORY BLOCKS

(71) Applicant: Micron Technology, Inc., Boise, ID (US)

(72) Inventors: Giuseppe Cariello, Boise, ID (US); Gaspare Giglio, Chandler, AZ (US); Patrick Miesen, Boise, ID (US); Jonathan Scott Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 799 days.

(21) Appl. No.: 17/136,775

(22) Filed: Dec. 29, 2020

(65) Prior Publication Data

US 2021/0203496 A1  Jul. 1, 2021

Related U.S. Application Data

(60) Provisional application No. 62/955,135, filed on Dec. 30, 2019.

(51) Int. Cl.
*H04L 9/08* (2006.01)
*G06F 12/14* (2006.01)

(52) U.S. Cl.
CPC ............ *H04L 9/0891* (2013.01); *G06F 12/14* (2013.01); *G06F 2212/1052* (2013.01)

(58) Field of Classification Search
CPC . H04L 9/0891; G06F 12/14; G06F 2212/1052
See application file for complete search history.

(56) References Cited

U.S. PATENT DOCUMENTS

| | | | |
|---|---|---|---|
| 2013/0014269 A1* | 1/2013 | Chang | G06F 21/79 726/26 |
| 2015/0293857 A1 | 10/2015 | Cope | |
| 2017/0337390 A1* | 11/2017 | Hamilton | H04L 9/0861 |
| 2018/0039581 A1 | 2/2018 | Hung et al. | |
| 2018/0189199 A1 | 7/2018 | Condict et al. | |

(Continued)

FOREIGN PATENT DOCUMENTS

| | | |
|---|---|---|
| CN | 103988465 | 8/2014 |
| CN | 104516834 | 4/2015 |
| CN | 104871169 | 8/2015 |

(Continued)

OTHER PUBLICATIONS

"Korean Application Serial No. 10-2020-0187729, Notice of Preliminary Rejection mailed Feb. 16, 2022", w English translation, 4 pgs.

(Continued)

*Primary Examiner* — Matthew T Henning
(74) *Attorney, Agent, or Firm* — Schwegman Lundberg & Woessner, P.A.

(57) ABSTRACT

Secure methods are described for modifying, erasing, or updating security keys for protected regions of a memory device by using a special firmware object (a key-modification firmware) loaded to the memory device that contains instructions to reprogram, modify, and/or erase the keys. To ensure that this key-modification firmware does not become a security risk, the key-modification firmware object may be protected from subsequent usage in a variety of ways.

20 Claims, 11 Drawing Sheets

(56) References Cited

U.S. PATENT DOCUMENTS

2019/0332552 A1 10/2019 Rodriguez De Castro
2022/0164293 A1* 5/2022 Pearson .............. G06F 12/1425

FOREIGN PATENT DOCUMENTS

| CN | 113126905 | 7/2021 |
| KR | 20100021446 | 2/2010 |
| KR | 20190057677 | 5/2019 |
| WO | 2012153144 | 11/2012 |

OTHER PUBLICATIONS

"Korean Application Serial No. 10-2020-0187729, Response filed Apr. 18, 2022 to Notice of Preliminary Rejection mailed Feb. 16, 2022", w English Claims, 16 pgs.
"Chinese Application Serial No. 202011595178.7, Office Action mailed Mar. 6, 2024", with English translation, 10 pages.

* cited by examiner

SECURE KEY UPDATE FOR REPLAY PROTECTED MEMORY BLOCKS

PRIORITY CLAIM

This patent application claims the benefit of priority, under 35 U.S.C. Section 119 to U.S. Provisional Patent Application Ser. No. 62/955,135, entitled "Configuring Access to Protected Memory," filed on Dec. 30, 2019 to Cariello, et al, which is hereby incorporated by reference herein in its entirety.

FIELD OF INVENTION

Embodiments pertain to memory devices. Some embodiments relate to securely updating keys for access to protected regions such as replay protected memory blocks.

BACKGROUND

Memory devices for computers or other electronic devices may be categorized as volatile and non-volatile memory. Volatile memory requires power to maintain data stored thereon. Volatile memory includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others.

Flash memory is utilized as non-volatile memory for a wide range of electronic applications. Flash memory devices typically include one or more groups of transistors such as floating gate or charge trap memory cells that allow for high memory densities, high reliability, and low power consumption.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
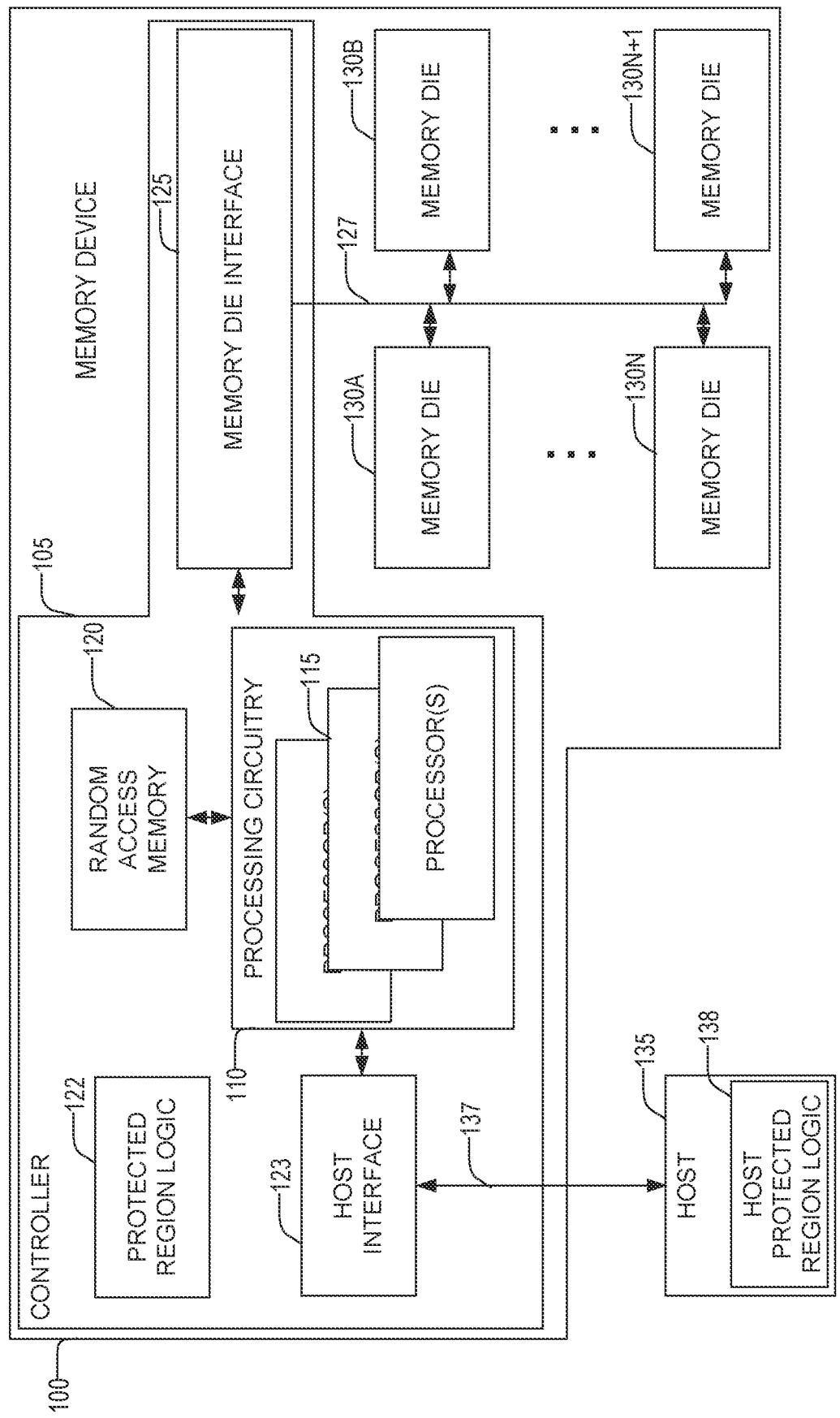
FIG. 1 illustrates a diagram of a memory device, such as a storage device according to some examples of the present disclosure.

Memory devices, such as flash memory devices, may utilize "Replay Protected Memory Blocks" or RPMB which prevent memory access of certain memory addresses unless the requestor provides a correct message authentication code (HMAC SHA-256) with the request. The message authentication code is calculated from a cryptographic security key in conjunction with a write counter and a nonce. The write counter and the nonce prevent replay attacks. The security key is programmed into memory device and host during system manufacturing to permanently couple.

After the security keys are programmed in both the memory device and the host device, manufacturing defects in components of the host device may cause one or more components to be replaced or redone on the host device. This may cause replacement of a component on the storage device that stores the security key or removal of the memory device and use in a different host device. In these cases, the host device and the memory device no longer have matching security keys. Replacement of keys on the memory device is disallowed by the Joint Electron Device Engineering Council (JEDEC) for security reasons.

More generally, other types of protection schemes other than RPMB may also be employed to secure access to one or more protected regions of a memory device that may differ from the procedure and access controls of RPMB. These protection schemes also typically require a requestor to provide a secret value to access (read, write, and/or modify) these protected regions. Frequently, the secret value is, or is calculated using, security keys that are programmed into both the host and the memory device. These other schemes may also have similar problems with changing and replacing keys after manufacturing.

Disclosed in some examples are methods, systems, memory devices, and machine-readable mediums for providing a secure method of modifying, erasing, or updating security keys for protected regions of a memory device by using a special firmware object (a key-modification firmware) loaded to the memory device that contains instructions to reprogram, modify, and/or erase the keys. To ensure that this key-modification firmware does not become a security risk, the key-modification firmware object may be protected from subsequent usage in a variety of ways.

In a first example, devices, or groups of devices (e.g., devices provided to each original equipment manufacturer (OEM) of the host device) may be provided with custom firmware objects specific to that device or group of devices. These custom firmware objects may be loaded by the memory device manufacturer or may be provided to the recipient of the device (e.g., an OEM) and loaded onto the memory device using a field-firmware update (FFU) process performed by the recipient. These firmware objects may have corresponding custom key-modification firmware objects that only work with the custom firmware object provided for the device. The key-modification firmware objects may then be used to clear, modify, and/or update the security key for the protected regions (e.g., RPMB regions) for devices with the matching custom firmware but may not be used to clear, modify, and/or update the security devices for other customers that have different custom firmware.

In other examples, to prevent unauthorized usage of the special firmware object, rather than coupling a custom firmware object and a custom key-modification firmware object, a generic firmware may be loaded to all memory devices. The memory device enables a key-modification firmware object if a configuration variable of the memory device is set to a defined security key-modification value prior to an operational metric of the memory device meeting an enablement lock condition (e.g., prior to a number of bytes written to the device exceeding a threshold). As an example, the key-modification firmware object is enabled if a defined string is written to a configuration variable prior to the device exceeding a particular number of bytes written (which may be zero bytes). The key-modification functionality may be disabled by modifying the configuration variable to another value. Since, in some examples, the configuration variable must be set to the security key modification value before user data is written to the memory device, once the device is used, the key-modification firmware cannot be subsequently enabled.

This allows the usage of standard firmware objects across groups of devices while providing OEM manufacturers a way to control the key-modification functionality. In some examples, the configuration variable may be an "OEM string attribute" of the memory device defined by a JEDEC standard that is typically set to a value indicating various device information such as vendor name that identifies the OEM. As previously noted, the custom key-modification firmware object may validate that the configuration variable was set to the particular prespecified value prior to the operational metric meeting the lock condition as a prerequisite to allowing the security keys to be updated. The security key modification value may be unique to a particular group of memory devices (e.g., the Security key modification value may be unique to each OEM). If the security key modification value is compromised, this would only affect devices within a particular device group and only devices which are not locked prior to shipment to customers.

In addition to requiring the security key modification value to be set to the configuration setting prior to the operational metric meeting the lockdown condition, the configuration setting may be set to a different value and locked from further modification by locking a configuration mode. This prevents further modifications to the configuration setting, providing yet another layer of protection. As previously noted, to enable the key-modification firmware, the configuration setting needs to be set to the security key modification value prior to the operational metric meeting the lockdown condition. This guards against manufacturers neglecting to overwrite the configuration setting or neglecting to lock the configuration mode. For example, when the amount of data written is greater than zero. Thus, even if the manufacturer does not touch the configuration value or lock the configuration, once the memory device is written to, the security keys cannot be changed, which would be the case for most memory devices that are in the hands of end users.

In some examples, the value of the security key modification value may be different for each device (e.g., may be or include device specific information such as a serial number); each host device OEM (e.g., may be or include an OEM specific identifier); or group of devices (e.g., may be or include a group specific identifier). This may prevent usage of a custom key-modification firmware object in different groups of devices as each custom key-modification firmware object may be coded to look for a different Security key modification value.

In some examples, the custom key-modification firmware object may be loaded by manufacturers on devices that need to have their security keys updated (e.g., using a field firmware update (FFU) process). In other examples, the key-modification firmware may be loaded onto all devices by the memory device manufacturer.

The above-mentioned techniques offer a secure way of replacing security keys by authorized users by ensuring that the security keys can be modified and then locked to prevent further modification. This solves a technical problem of modifying security keys in a secure manner using technical solutions to secure the ability to modify the security keys using matched firmware and key-modification firmware objects or use of configuration settings and operational metrics.

Memory Device Overview

As previously noted, flash memory is utilized as non-volatile memory for a wide range of electronic applications. Flash memory typically includes one or more groups of transistors such as floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Flash memory cells in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storage cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), or one of various forms of managed memory device. Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards such as JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a "host" as discussed later herein. In such managed memory devices, the controller functionality may be implemented on one or more die also incorporating a memory array, or on a separate die). In other examples, one or more memory devices may be combined with controller functionality to form a solid-stage drive (SSD) storage volume. The term "memory system," is used herein as inclusive of one or more memory die, and any controller functionality for such memory die, when present; and thus, includes individual memory devices, managed memory devices, and SSDs.

For purposes of the present description, example embodiments include managed memory devices implementing NAND flash memory cells, termed "managed NAND" devices. Such managed NAND devices may be constructed and operated generally in accordance with the described JEDEC UFS Flash Storage 3.0 specification, as may be modified as appropriate to incorporate the structures and functionality described herein. However, the described functionality may be implemented with other types of memory devices, as described above, which may incorporate other storage technologies, a few non-limiting examples of which were discussed earlier herein; and may be configured for operation in accordance with other industry standards, as discussed above; or in accordance with non-industry standard protocols.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates a diagram of a memory device 100, such as a storage device according to some examples of the present disclosure. Memory device 100 may include one or more host interfaces 123 which may utilize one or more protocols such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces to communicate with a host device 135. Host 135 may send one or more commands, such as read comments, write commands, erase commands, and the like to the memory device 100 through the host interface 123. Host interface 123 may be part of controller 105 or may be implemented by separate circuitry. The memory device 100 may send data, command responses, and the like to host device 135 over the host interface over the host bus 137.

Memory device 100 may include one or more memory controllers 105. Controller 105 may include processing circuitry 110 which may include one or more hardware processors 115. Processors 115 may be general purpose hardware processors that execute firmware or other software instructions for performing operations of the memory device, including implementing the host interface 123, protected region logic 122, and memory die interface 125. In other examples, the processor(s) 115 may be special purpose hardware processors that are specifically designed to perform the operations of the memory device 100 through hardware logic and/or through the execution of software instructions. Processing circuitry 110 may also include logic circuits and other circuit components configured to perform various control functionality and memory management operations, or portions thereof, examples of which are described below.

In the depicted example, memory device 100 includes a host interface 123 providing communication through a host bus 137 to external host device 135. The configuration of host interface 123 may be of various forms depending upon the specific configuration of memory device 100 (which may also be termed a "memory system"). For example, in an example in which memory device 100 is a UFS device, the host interface will be in accordance with the applicable UFS standard.

Memory device 100 also incorporates one or more memory die interfaces 125 between the processing circuitry 110 of the controller 105 and at least some portion of the memory dies 130-A-130N+1 within memory device 100. Memory die interface 125 may be part of controller 105 or may be implemented by separate circuitry. For example, in the example of a UFS device, one or more of the memory die interfaces 125 will be a suitable memory interface, for example an Open NAND Flash Interface ("ONFI"), such as that defined by the ONFI 4.0 Specification, or later versions or revisions thereof.

Components of the memory device 100, such as controller 105, may include a random-access memory (RAM) 120 for performing the operations of the memory device 100. The random-access memory 120 may be separate from the controller 105 or, as shown, may be integrated in the controller 105.

Figure 4:
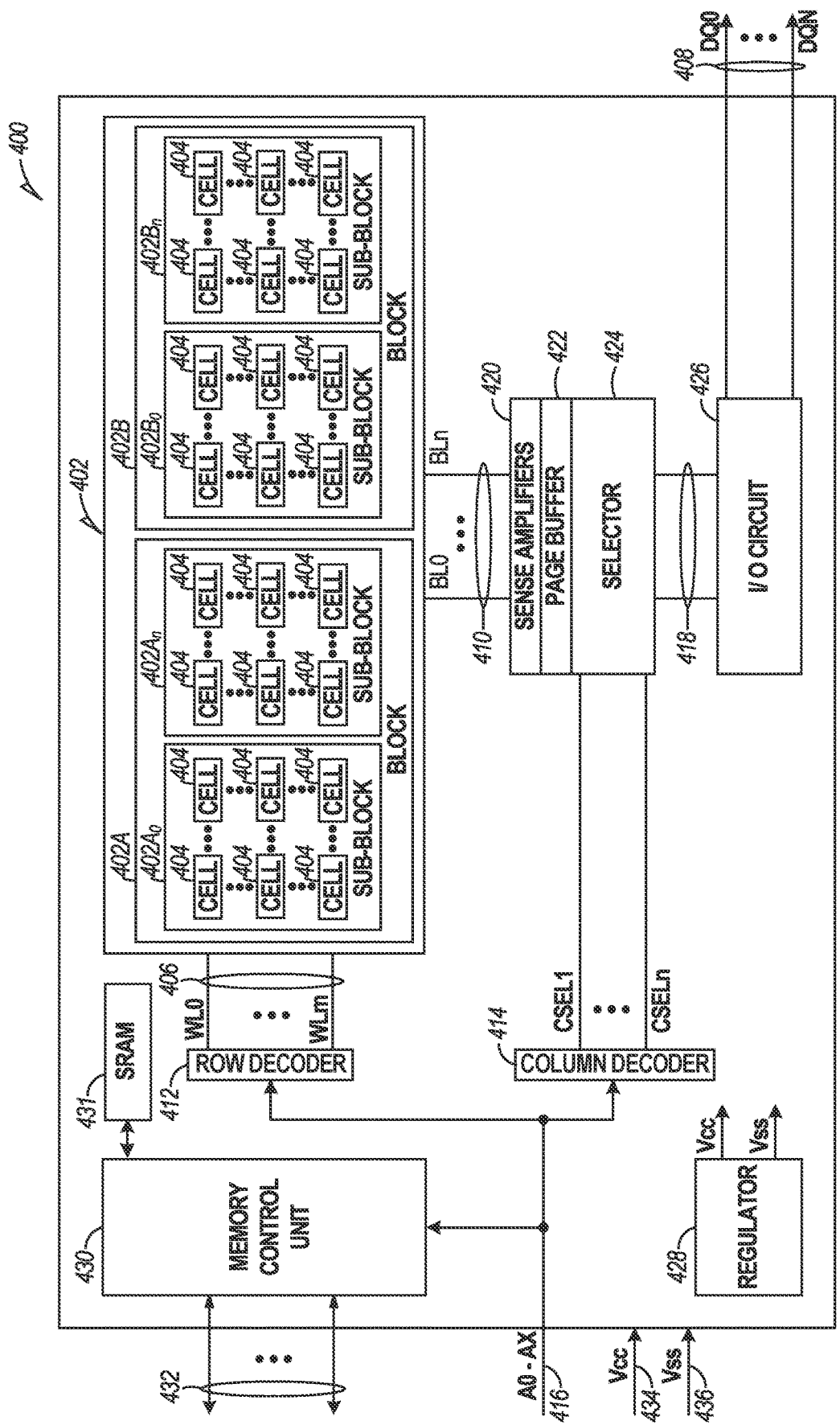
FIG. 4 illustrates an example block diagram of a memory die according to some examples of the present disclosure.

Controller 105 may handle one or more functions of the memory by interacting with the memory cells of the memory device that are part of one or more memory dies 130-A-130N+1. A schematic of an example implementation of a memory die 130 is shown in FIG. 4. The controller 105 may communicate with these memory dies through the memory die interface 125 across a memory die bus 127. In some examples, the memory dies may have their own device controllers, including processing circuitry and processors, to control operations on the respective memory die. Such device controllers may be formed on a common die with the device storage array or may be on a separate die from that containing the device storage array. Both configurations are embraced by the identified "memory die" (130A-N+1) described herein. Memory dies may be NAND dies, three-dimensional NAND dies, phase change memory dies, and the like.

The host device 135 may be a personal computer, a smartphone, a tablet, a portion of an integrated circuit, an Internet of Things (IoT) device (e.g., a refrigerator or other appliance, sensor, motor or actuator, mobile communication device, automobile, drone, etc.), or the like.

For purposes of the present description example memory operation and management functions may be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions.

The memory dies 130-A-130-N+1 can include several memory cells arranged in, for example, a number of planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.). Example arrangement of memory cells are shown and described with respect to FIG. 2-3.

In operation, data is typically written to or read from the memory device 100 in pages and erased in blocks. However, one or more memory operations (e.g., read, write, erase, etc.) can be performed on larger or smaller groups of memory cells, as desired. The data transfer size of a memory device 100 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells can provide for different page sizes or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

One or more memory cells of the memory die 130 may be protected regions requiring authentication to access. As noted, the authentication may be through providing a secret value along with the request to access one or more memory cells in the protected regions. Protected region logic 122 implements access protection to one or more protected regions of storage provided by the memory die 130A-N+1, such as RPMBs. The protected region logic 122 may verify that requests for access to the protected regions are authenticated. Protected region logic 122 may receive an access request for a protected region and may verify that a secret included in the request (e.g., a MAC value) is correct, such as by using a stored copy of the security key.

The security key may be stored in a location in the memory die 130A-N+1 or in a special memory chip within memory device 100. Protected region logic 122 may include instructions included in a key-modification firmware object to replace or modify the key. Whether this functionality is enabled may depend on one or more configuration settings, operational metrics, and enablement lock conditions (e.g., thresholds) or the existence of a compatible generic firmware. These configuration settings, operational metrics, and enablement lock conditions may be encoded into the key-modification firmware object, may be stored in memory cells of the memory die 130A-N+1 or may be stored in other memory of the memory device (e.g., static memory). For example, the protected region logic 122, may implement the flowcharts of FIGS. 6 and 9; and may implement the state diagram of FIG. 8. As noted, the protected region logic 122 may comprise instructions provided by the regular firmware object and/or the key-modification firmware object. Protected region logic 122 may implement an RPMB process as documented by one or more standards such as JEDEC standards.

Host 135 may also have a host protected region logic 138 that may implement instructions for the host 135 to send access requests requesting read, writes, and other operations to protected memory regions. The host protected region logic 138 may format requests for protected memory regions (such as RPMB requests according to a JEDEC standard), including putting the secret value in the request (e.g., by calculating the MAC based upon the security key stored on the host). Host protected region logic 138 may also execute one or more operations to request the setting of one or more configuration settings on the memory device 100, including a configuration setting that enables security key replacement. Additionally, host protected region logic 138 may have logic to replace, erase, or otherwise change the security keys by communicating with the protected region logic 122 (e.g., through request messages and reply messages).

Figure 2:
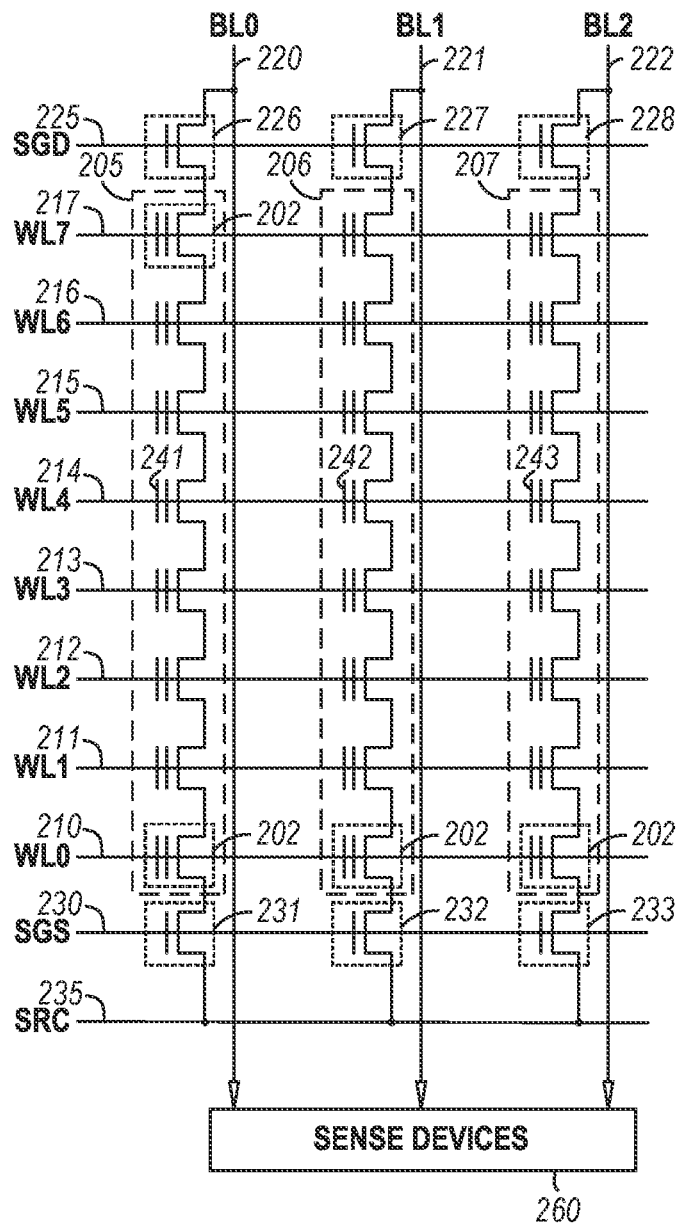
FIG. 2 illustrates an example schematic diagram of a portion of a NAND architecture semiconductor memory array according to some examples of the present disclosure.

FIG. 2 illustrates an example schematic diagram of a portion of a NAND architecture semiconductor memory array 200 including a plurality of memory cells 202 arranged in a two-dimensional array of strings (e.g., strings 205-207) and tiers (e.g., illustrated as respective word lines (WL) WL0-WL7 210-217, a drain-side select gate (SGD) line 225, a source-side select gate (SGS) line 230, etc.), and sense amplifiers or devices 260 according to some examples of the present disclosure. The memory array 200 can illustrate an example schematic diagram of a portion of one physical page of memory cells of a memory die 130 from FIG. 1.

Each string of memory cells is coupled to a source line (SRC) 235 using a respective source-side select gate (SGS) (e.g., SGS 231-233), and to a respective data line (e.g., bit lines (BL) BL0-BL2 220-222) using a respective drain-side select gate (SGD) (e.g., SGDs 226-228). Although illustrated with 8 tiers (e.g., using word lines (WL) WL0-WL7 210-217) and three data lines (BL0-BL2 226-228) in the example of FIG. 2, other examples can include strings of memory cells having more or fewer tiers or data lines, as desired.

In a NAND architecture semiconductor memory array, such as the example memory array 200, the state of a selected memory cell 202 can be accessed by sensing a current or voltage variation associated with a particular data line containing the selected memory cell. The memory array 200 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., control gates (CGs) 241-243 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the charge storage structures of the targeted memory cells. Such charge storage structures may include, for example floating gates or charge trap regions of the respective memory cells. In floating gate memory cells charge is stored in an isolated polysilicon structure; while in charge trap memory cells the charge is typically stored in a dielectric structure.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the charge storage structures of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 260, coupled to one or more of the data lines (e.g., first, second, or third bit lines (BL0-BL2) 220-222), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

For Single Level Cells (SLC), there are two possible voltage levels programmed into the cell, one voltage level represents a binary '1' and another voltage level represents a binary '0' For Multi-Level Cells (MLC), there are four possible voltage levels programmed into the cell. The four possible voltage levels represent '00', '01', '10', and '11'. To program an MLC cell, multiple programming pulses are applied. A first pulse programs a first "page" of data that represents either the most significant bit or least significant bit of the cell. A second pulse programs the second "page" of data that represents the other bit of the cell that was not programmed by the first pulse. Similarly, Triple Level Cells (TLC) store eight possible voltage levels and Quad Level Cells (QLCs) store 16 possible voltage levels.

To read a value stored in one or more memory cells, a read voltage is applied to the wordline of the selected cells. If the voltage stored in the cells of the wordline is greater than the read voltage, the cell passes a voltage to the sense amplifier. For an SLC cell, the read voltage is selected to be between the two voltages representing a '1' and a '0.' For MLC, TLC, and QLC, multiple read operations are used to read each bit stored in the cell—each read operation utilizes a different read voltage.

To erase a memory cell or a group of memory cells (e.g., erasure is typically performed in blocks or sub-blocks), an erasure voltage (Vers) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the charge storage structures of the targeted memory cells to the channels.

Figure 3:
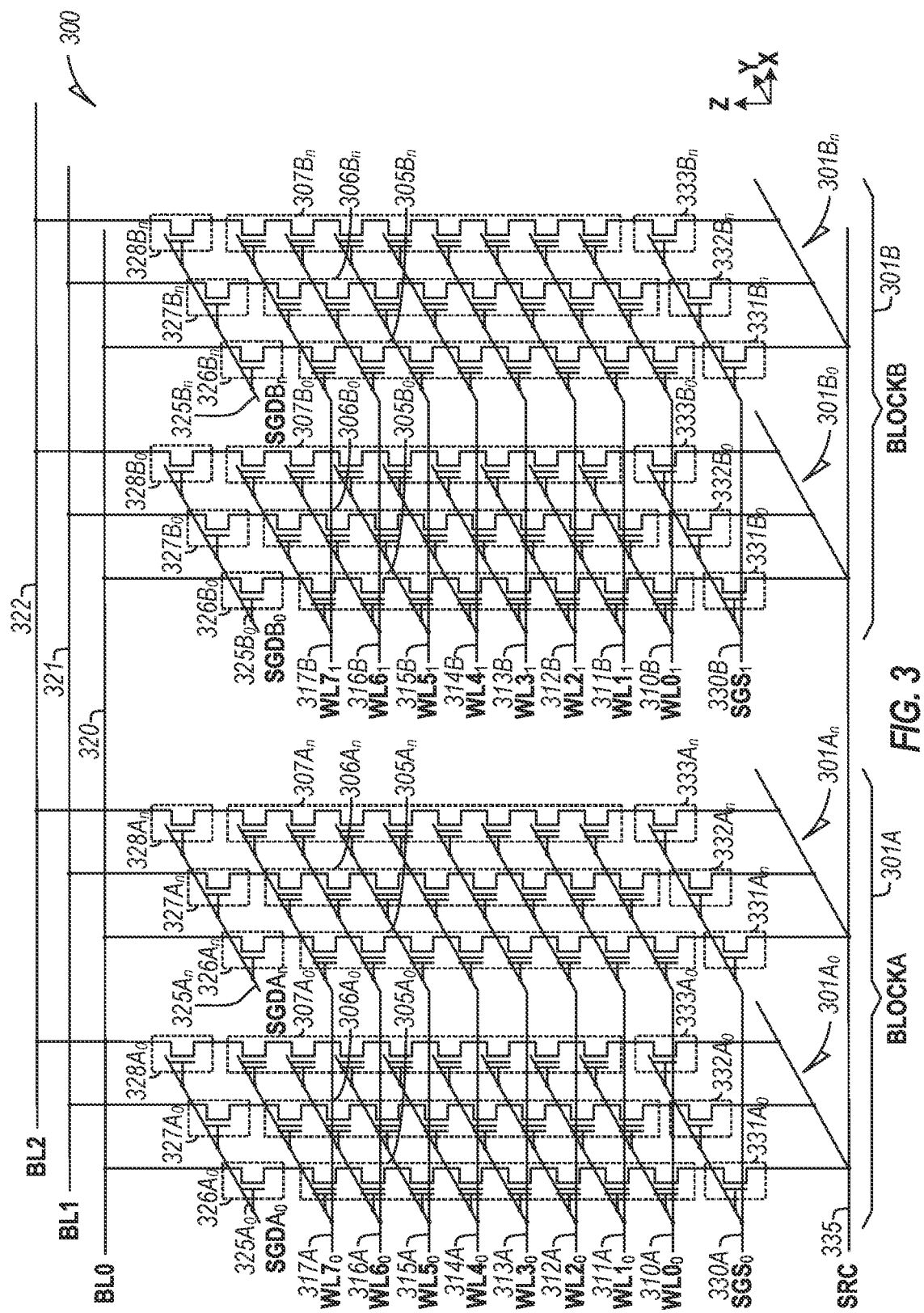
FIG. 3 illustrates an example schematic diagram of a 3D NAND architecture semiconductor memory according to some examples of the present disclosure.

FIG. 3 illustrates an example schematic diagram of a 3D NAND architecture semiconductor memory array 300 including a number of strings of memory cells (e.g., $A_0$ memory strings $305A_0$-$307A_0$, $A_n$ memory strings $305A_n$-$307A_n$, $B_0$ memory strings $305B_0$-$307B_0$, $B_n$ memory strings $305B_n$-$307B_n$, etc.), organized in blocks (e.g., block A 301A, block B 301B, etc.) and sub-blocks (e.g., sub-block $A_0$ $301A_0$, sub-block $A_n$ $301A_n$, sub-block $B_0$ $301B_0$, sub-block $B_n$ $301B_n$, etc.). The memory array 300 represents a portion of a greater number of similar structures that would typically be found in a block, device, or other unit of a memory device. The memory array 300 can illustrate an example schematic diagram of portions of memory cells that make up memory die 130 from FIG. 1.

Each string of memory cells includes a number of tiers of charge storage transistors (e.g., floating gate transistors, charge-trapping structures, etc.) stacked in the Z direction, source to drain, between a source line (SRC) 335 or a source-side select gate (SGS) (e.g., $A_0$ SGS $331A_0$-$333A_0$, $A_n$ SGS $331A_n$-$333A_n$, $B_0$ SGS $331B_0$-$333B_0$, $B_n$ SGS $231B_n$-$233B_n$, etc.) and a drain-side select gate (SGD) (e.g., $A_0$ SGD $326A_0$-$328A_0$, $A_n$ SGD $326A_n$-$328A_n$, $B_0$ SGD $326B_0$-$328B_0$, $B_n$ SGD $326B_n$-$328B_n$, etc.). Each string of memory cells in the 3D memory array can be arranged along the X direction as data lines (e.g., bit lines (BL) BL0-BL2 320-322), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 300 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 300 includes a control gate (CG) coupled to (e.g., electrically or otherwise operatively connected to) an access line (e.g., word lines (WL) $WL0_0$-$WL7_0$ 310A-317A, $WL0_1$-$WL7_1$ 310B-317B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, $A_0$ SGD $326A_0$-$328A_0$ can be accessed using an $A_0$ SGD line SGDA$_0$ $325A_0$, $A_n$ SGD $326A_n$-$328A_n$ can be accessed using an SGD line SGDA$_n$ $325A_n$, $B_0$ SGD $326B_0$-$328B_0$ can be accessed using an $B_0$ SGD line SGDB$_0$ $325B_0$, and B SGD $326B_n$-$328B_n$ can be accessed using an $B_n$ SGD line SGDB$_n$ $325B_n$. $A_0$ SGS $331A_0$-$333A_0$ and $A_n$ SGS $331A_n$-$333A_n$ can be accessed using a gate select line SGS$_0$ 330A, and $B_0$ SGS $331B_0$-$333B_0$ and $B_n$ SGS 3318-333B can be accessed using a gate select line SGS, 330B.

In an example, the memory array 300 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

FIG. 4 illustrates an example block diagram of a memory die 400 according to some examples of the present disclosure. Memory die 400 may be one example of memory die 130A-130N+1 of FIG. 1. Memory die 400 may include a memory array 402 having a plurality of memory cells 404, and one or more circuits or components to provide communication with, or perform one or more memory operations on, the memory array 402. The memory die 400 can include a row decoder 412, a column decoder 414, sense amplifiers 420, a page buffer 422, a selector 424, an input/output (I/O) circuit 426, and a dedicated memory controller, in the form of memory control unit 430, including processing circuitry, potentially including one or more processors, as described earlier herein.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory die 400 according to one or more signals and/or instructions/commands received on control lines 432 at a memory interface with a memory controller (as described relative to controller 105 and host interface 123 of memory device 100 of FIG. 1. Such signals and/or instructions may include, for example, one or more clock signals and/or control signals that indicate a desired operation (e.g., write, read, erase, etc.), or address signals (A0-AX) received on one or more address lines 416. One or more devices external to the memory die 400 can control the values of the control signals on the control lines 432, or the address signals on the address line 416. Examples of devices external to the memory die 400 can include, but are not limited to, a host, a memory controller, a processor, or one or more circuits or components not illustrated in FIG. 4.

The memory die 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory die 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory die 400, such as a controller 105, can communicate with the memory die 400 using the I/O lines (DQ0-DQN) 408, address lines 416 (A0-AX), or control lines 432. The input/output (I/O) circuit 426 can transfer values of data in or out of the memory die 400, such as in or out of the page buffer 422 or the memory array 402, using the I/O lines 408, according to, for example, the control lines 432 and address lines 416. The page buffer 422 can store data received from the one or more devices external to the memory die 400 before the data is programmed into relevant portions of the memory array 402 or can store data read from the memory array 402 before the data is transmitted to the one or more devices external to the memory die 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418. In some examples a flash translation layer (not shown) can map addresses provided by a host to physical memory addresses used by the row decoder 412 and column decoder 414 to read data in the memory array 402.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

The Memory control unit 430 may utilize Random Access Memory (RAM) such as SRAM 431 to assist in performing operations to control the memory operations of the memory die 400. For example, the SRAM 431 may store one or more instructions, working values, and other calculations. The memory control unit 430 may execute software instruction sets, such as microcode which may reside on fully or partially on SRAM 431, within the memory control unit 430 (e.g., in dedicated registers, ROM, Flash, or other dedicated memory), within one or more memory cells (such as memory cells 404), or the like. SRAM 431 may store one or more page buffers that are used by the memory control unit 430 to temporarily store data being read from or written to the memory cells (such as memory cells 404).

Key Replacement

As noted, OEMs of host devices or otherwise authorized users may wish to reset (e.g., erase, wipe, and/or reprogram) the security keys to allow rework of defects in circuit boards or other components. Memory device manufacturers can provide OEM customers and other authorized users with specialized key-modification firmware to erase keys. These firmware objects may be loaded onto memory devices via mechanisms such as field firmware update (FFU) mechanisms. As previously described, this key-modification firmware can become a security risk if unauthorized users gain access to the key-modification firmware and use it to place malware on competitors' memory devices, spoof security keys, or perform other malicious actions.

As previously mentioned, one method to avoid such a security risk is to create unique pairs of production and key-modification firmware for each unique customer. Each customer may have a specific operating firmware object and a paired key-modification firmware. The key-modification firmware only modifies the security keys on devices with the matched operating firmware. Thus, a leak of the key-modification firmware for a first OEM will thereafter not affect a second OEM. This adds to the cost and complexity of manufacturing the memory device as each custom operating firmware needs to be loaded by the memory device manufacturer. In some examples, to ease this burden, a generic operating firmware may be loaded by the memory device manufacturer. The custom operating firmware may then be provided to the customer OEM and loaded by the customer OEM using a Field Firmware Update (FFU) process.

Figure 5:
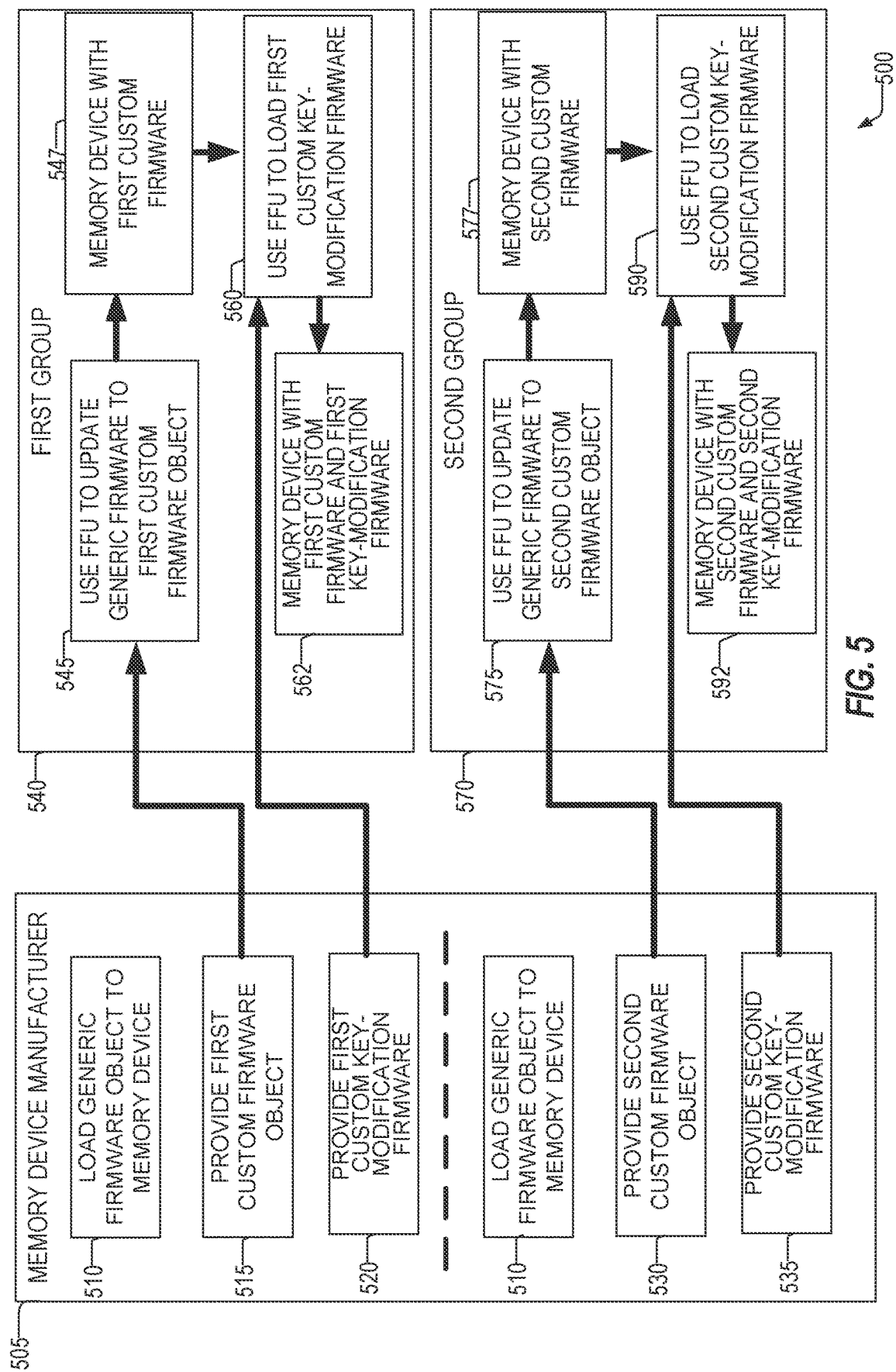
FIG. 5 illustrates a first example flow for limiting unauthorized modification of security keys using matched operating firmware and key-modification firmware according to some examples of the present disclosure.

FIG. 5 illustrates a first example flow 500 for limiting unauthorized modification of security keys using matched operating firmware and key-modification firmware according to some examples of the present disclosure. The example flow 500 utilizes the FFU update process to load custom operating firmware as well as the key-modification firmware onto the memory device.

The flow 500 can be implemented by the memory device manufacturer 505, OEMs, or other authorized users. While certain organizations (e.g., memory device manufacturer, OEM, device groups, etc. . . . ) are shown in FIG. 5 as performing certain operations, one of ordinary skill in the art will appreciate that other organizations may perform any or all of the operations in FIG. 5. In the example flow 500, a generic production firmware object is loaded to the memory device 510. The generic production firmware object is configured for provision to multiple customers, represented by first group 540 and second group 570. Groups 540 and 570 represent OEM customers or other logical groupings of devices (e.g., device revisions, distribution regions, or the like).

The example flow 500 further includes providing customized firmware to customers that need specialized features or key-modification functionality. For example, first customized firmware object may be provided 515 to first group 540 and second customized firmware object may be provided 530 to second group 570, such that each of first group 540 and second group 570 can implement customer-specific features. In some examples, the firmware objects may be transmitted, e.g., through a computer network from one entity to another.

First customized firmware object can be loaded (e.g., by first group 540) to those memory devices using a field firmware update (FFU) technique 545. This produces a memory device with the first custom firmware 547. Second customized firmware object can be loaded (e.g., by the second group 570) using a field firmware update (FFU) technique 575. This produces a memory device with the second custom firmware 577. If key-erasing firmware is to be provided for security key erasing, then first custom key-modification firmware may be provided 520, which may be loaded to the memory device (e.g., by first group 540) using an FFU process 560 to produce a memory device with the first custom firmware and first key-modification firmware 562. The FFU process 560 may load the custom key-modification firmware onto the memory device without overwriting the first custom firmware object. Second custom key-modification firmware may be provided 535 that may be loaded to memory devices of the second group 570 using an FFU technique 590 (e.g., by the second group 570) to produce a memory device with the second custom firmware and second key-modification firmware 592.

Users may then utilize the custom key-modification firmware to modify one or more security keys of one or more protected regions. Once the keys are modified, in some examples, the custom key-modification firmware may be removed from the memory device.

In some examples, the first customized firmware object and the second customized firmware object may be further customized by using a configuration setting on the memory device. For example, an OEM String value may be set to a particular value. The firmware may read this value to determine one or more settings and/or customized operating parameters of the memory device.

Figure 6:
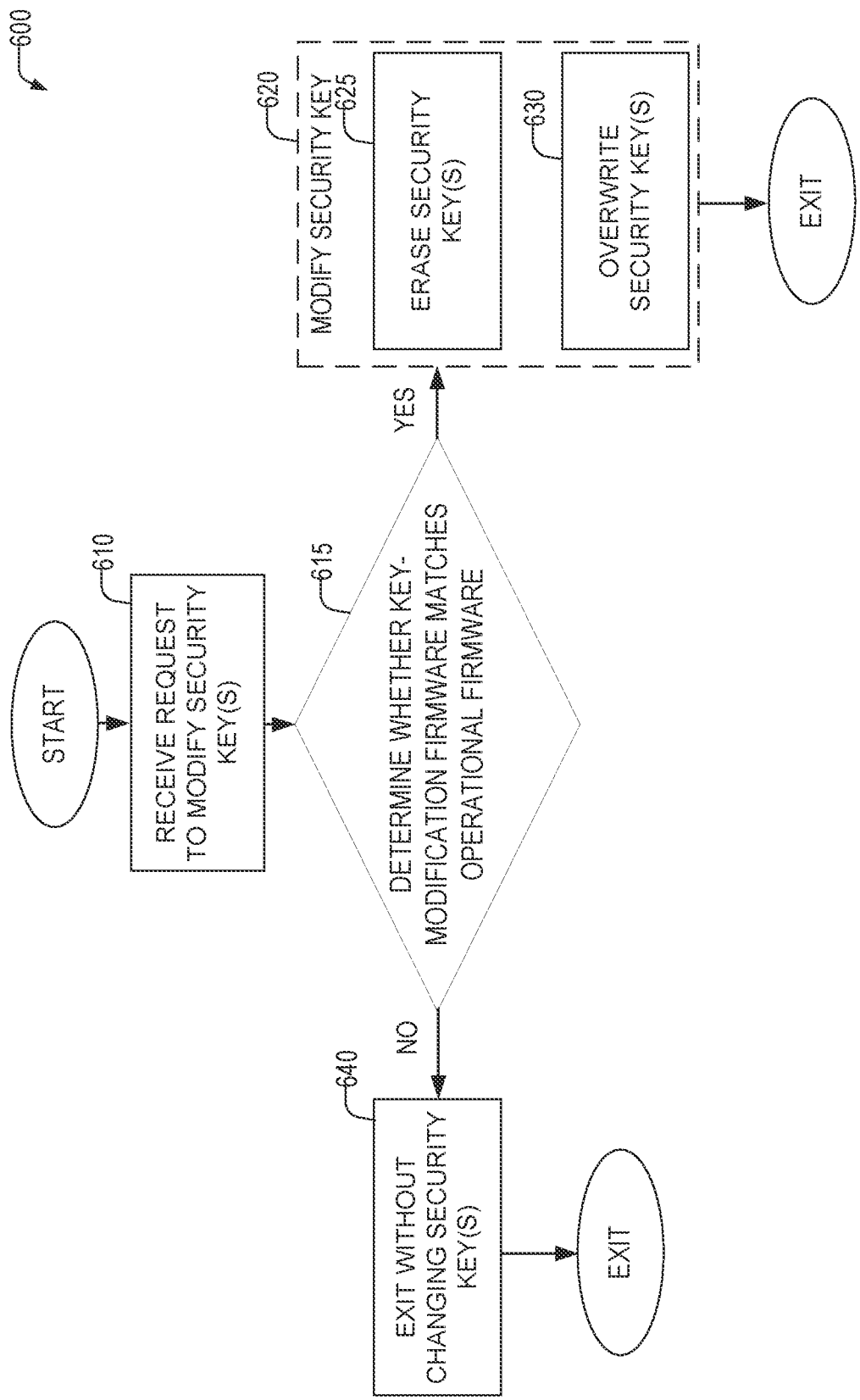
FIG. 6 illustrates a flowchart of a method of updating security keys of a protected portion of a memory device using matched firmware according to some examples of the present disclosure.

FIG. 6 illustrates a flowchart of a method 600 of updating security keys of a protected portion of a memory device using matched firmware according to some examples of the present disclosure. Prior to the execution of method 600, the custom key-modification firmware is loaded to the memory device using an FFU process. At operation 610, the memory device receives a request to modify one or more security keys of one or more protected regions. At operation 615, the memory device may determine whether the key-modification firmware matches the executing firmware.

In some examples, operation 615 is performed by the FFU when attempting to load the key-modification firmware. In these examples, if the key-modification firmware doesn't match the operational firmware, the FFU process may not load the key-modification firmware to the memory device. If the key-modification firmware matches the operational firmware, then the Security key may be modified at 620. In some examples, the match is checked based upon one or more firmware versions—e.g., the key-modification firmware checks a firmware version of the operational firmware. In other examples, the key-modification firmware checks a hash of the operational firmware, a size of the operational firmware, a value stored within the operational firmware, or the like.

Modifying the security key 620 may include erasing the security keys 625 and/or replacing the security keys 630. If the key-modification firmware does not match the operational firmware, then at operation 640, the security keys are not modified. This may include rejecting the request or taking no action on the request. In some examples, one or more of the operations of method 600 are performed by the key-modification firmware and/or operational firmware. As noted, in some examples, operation 615 may be performed during the FFU. In these examples, the activated and/or loaded key-modification firmware may respond to the request by modifying the security key 620.

The example flows of FIGS. 5 and 6 can be suitable for inventory management for released devices, due to the use of field firmware updates. However, use of field firmware updates can introduce extra steps, and therefore inefficiencies, in device manufacturing (e.g., phone manufacturing) operations for OEM customers. Further, the field firmware update itself can be exposed to attack, potentially allowing malicious parties to change customized firmware. For example, loading a second custom firmware on devices of the first group 540 and using the second custom key-modification firmware to reset the security keys.

Figure 7:
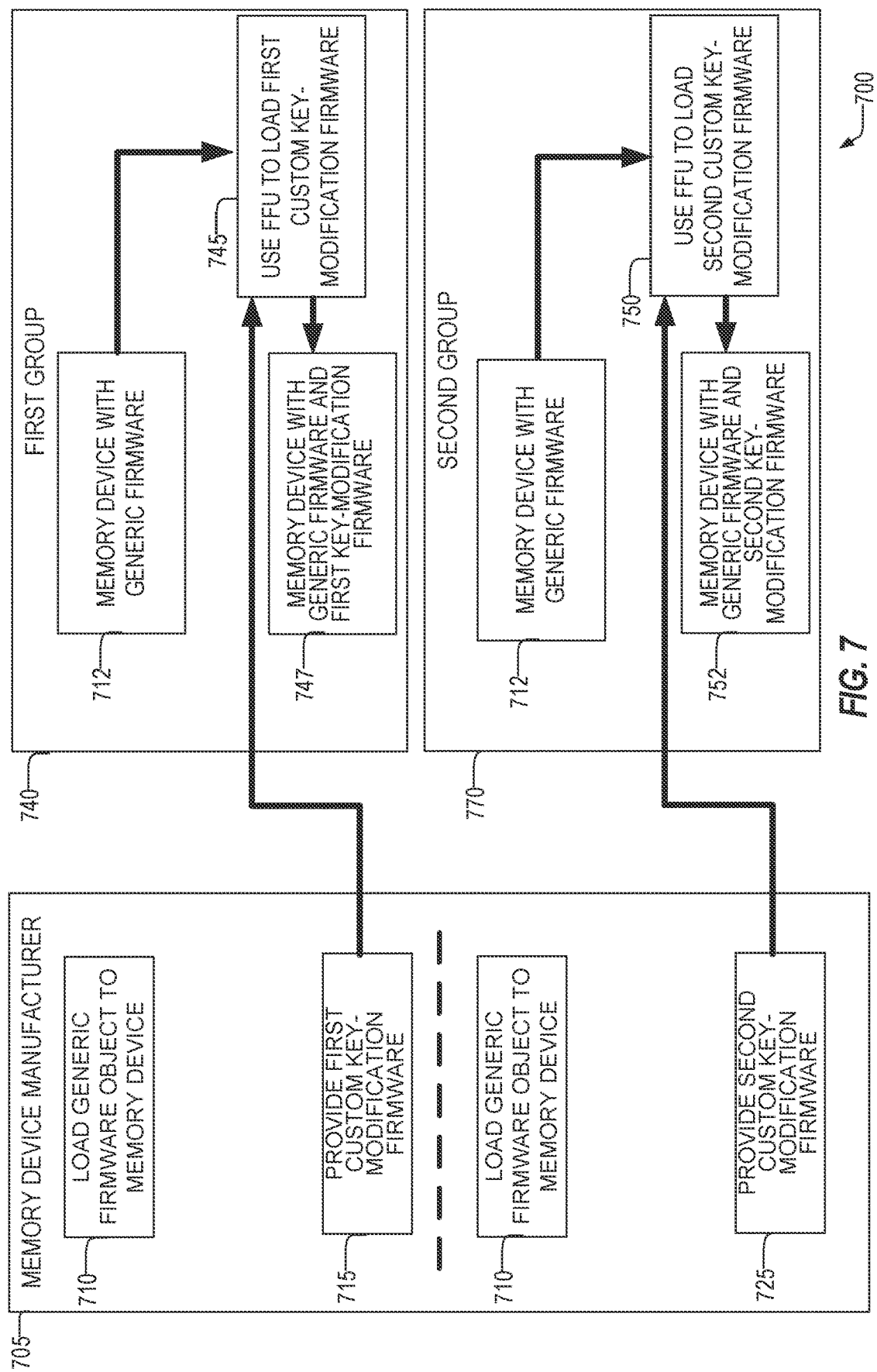
FIG. 7 illustrates a first example flow for limiting unauthorized modification of Security keys using configuration settings according to some examples of the present disclosure.

FIG. 7 illustrates a first example flow 700 for limiting unauthorized modification of Security keys using configuration settings according to some examples of the present disclosure. While certain organizations (e.g., memory device manufacturer 705, OEM, device groups, etc. . . . ) are shown in FIG. 7 as performing certain operations, one of ordinary skill in the art will appreciate that other organizations may perform any or all of the operations in FIG. 7. The example flow 700 utilizes the FFU update process to load the key-modification firmware onto the memory device. While in FIG. 6, custom functions of the firmware for each group were enabled by a custom firmware object, in FIG. 7, these functions are provided by enabling/activating/or disabling these features in a generic firmware through the use of configuration values. This includes the ability to enable security key replacement or modification.

The flow 700 can be implemented by one or more of the memory device manufacturer and/or the OEM or users. In the example flow 700, a generic production firmware object may be loaded to the memory device 710 configured for provision to multiple groups, such as first group 740 and second group 770 to create a memory device 712. Groups 740 and 770 represent OEM customers or other logical groupings of devices (e.g., device revisions; distribution regions; or the like). By providing common production firmware, the example flow 700 can reduce or eliminate the need to track different versions of production firmware (as was the case in FIG. 5).

If key-modification firmware is to be provided for security key modifications, then first custom key-modification firmware may be provided 715, which may be loaded (e.g., by the first group 730) to the memory device using an FFU process 745 to create a memory device with generic firmware and first key-modification firmware 747. In some examples, the key-modification firmware objects may be provided by transmitting them, e.g., through a computer network from one entity to another.

The FFU process 745 may load the custom key-modification firmware onto the memory device without overwriting the first custom firmware object. Second custom key-modification firmware may be provided 725 that may be loaded to memory devices of the second group 770 (e.g., by the second group 770) using an FFU technique 750 to create a memory device with generic firmware and a second key-modification firmware 752.

The key-modification firmware may be enabled by setting a configuration value to a particular identified value. The value may be a same value for the first group 730 as the second group 740, but in other examples, for enhanced security, a different value may be used for the first group 730 than the second group 740. The value may be specified in each version of the first and second key-modification firmware and may be checked by the key-modification firmware prior to allowing modification of the security keys.

As previously described, in some examples, existing JEDEC attributes may be used for the configuration setting.

These attributes may be stored in non-volatile memory for a memory device. In addition to enabling the key-modification firmware, these attributes may have additional usages. Depending on whether the memory device is configured by the manufacturer, or the customer, different options for memory device operation may be implemented by changing these values. For example, the JEDEC standards currently define an attribute (e.g., an "Original Equipment Manufacturer (OEM) string attribute") whose default value is comprised of a predefined vendor name that uniquely identifies that OEM. However, OEMs can change this default value by writing a different value to the respective area of non-volatile memory. Methods according to example embodiments enable and disable key-modification firmware based on the value that has been written for the OEM string attribute. Similarly, the OEM string attribute can be used to enable other customized firmware on the memory device.

Figure 8:
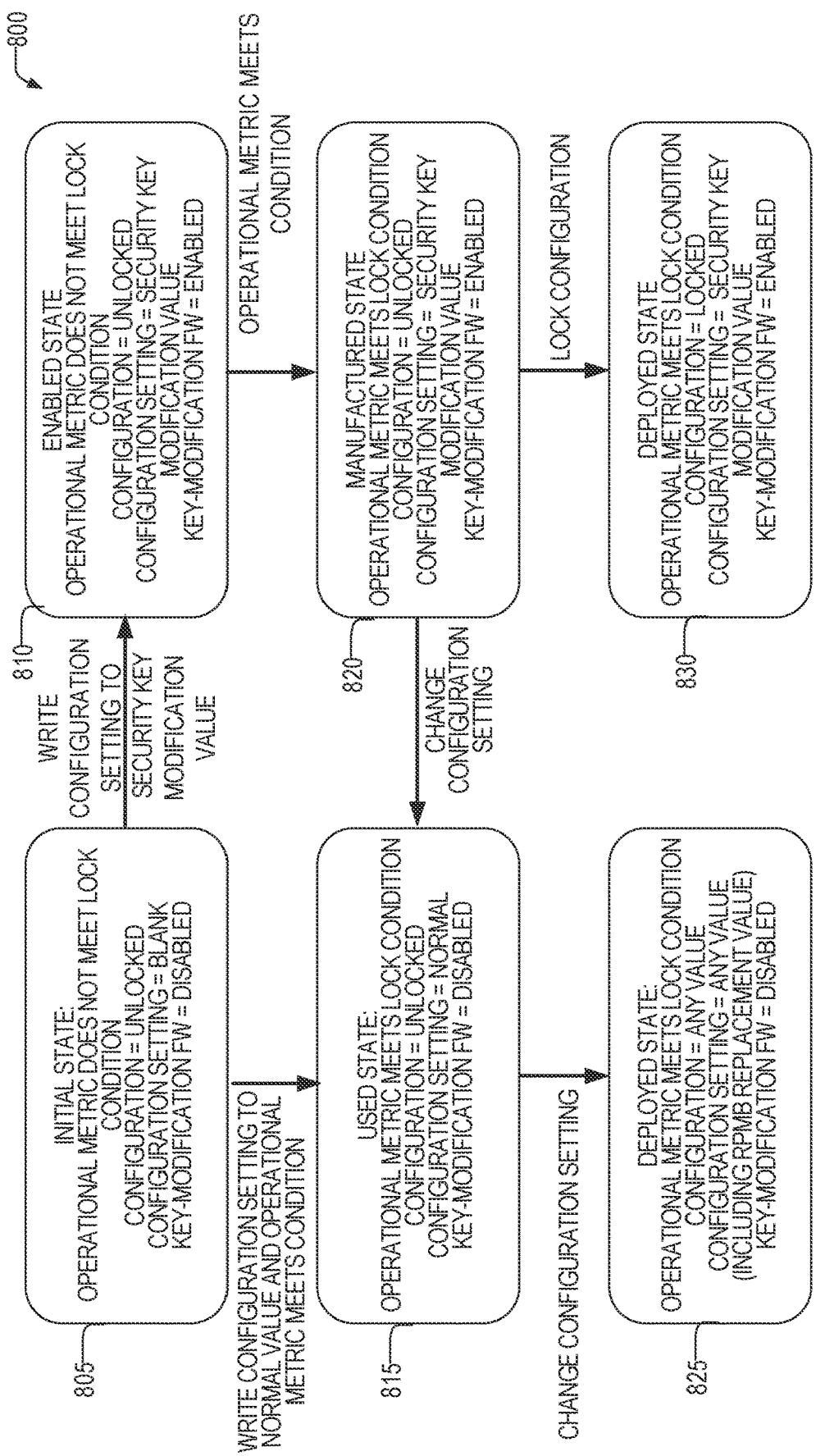
FIG. 8 illustrates an example state transition diagram of memory controller to control when, and under what conditions, key-erasing firmware will be enabled.

FIG. 8 illustrates an example state transition diagram 800 of memory controller 105 to control when, and under what conditions, key-erasing firmware will be enabled. Referring to FIG. 8, in some embodiments, a memory device (e.g., memory device 100 (FIG. 1)) can be provided to a customer (e.g., a mobile device manufacturer) in an initial state 805, wherein, for example: the operational metric does not meet an enablement lock condition; the configuration is unlocked (e.g., configuration will be permitted to be performed); the value for the configuration setting is blank (or in a default state or an unwritten state); and key-modification firmware is disabled, meaning at least that security keys cannot be wiped on the memory device 100.

As previously described, the security keys may be set by the memory device manufacturer or by the OEM/customer at an earlier time period. The key-modification firmware can consist of one functions of a set of firmware binary code (e.g., which may include other unrelated functions), or the key-modification firmware can consist of dedicated, separate firmware binary code without other unrelated functions.

The customer can change the memory device from state 805 to state 810 (e.g., "enabled state") by writing a value (e.g., the security key modification value) to the configuration setting. As the operational metric (e.g., a write counter) does not meet the lock condition (e.g., the operational metric, such as a write counter, is below a threshold), and the configuration setting is set to the Security key modification value, the key-modification firmware is enabled. Once the key-modification firmware is enabled a user could submit a request to the key-modification firmware to erase the security keys, replace the security keys, or in some examples, both. In some embodiments, the memory device can be manufactured by the memory manufacturer (and provided to the customer) in state 810 rather than in state 805. The security key modification value can be designated by the customer or the manufacturer of the memory device. When the security key modification value is kept secret, outside parties can be prevented from enabling the key-modification firmware to change security keys and gain access to protected memory. In some examples, other customer-specific firmware features can be enabled when the value for configuration setting is set to a particular value (e.g., states 815). For example, the security key modification value may be specific to the OEM and also serve to enable OEM specific features. In other examples, other values may be set to the configuration setting after the security key modification value to enable specific features.

The memory device may transition from state 805 to state 815 (e.g., "used state"), for example by: utilizing the memory device such that the operational metric meets the lock condition (e.g., by writing data to the memory device such that the number of bytes written is greater than zero), by writing a value other than the security key modification value to the configuration setting, or by performing both operations. Further configuration operations may be performed on the memory device while the memory device in state 815. However, key-modification firmware may remain disabled.

If the memory device 100 is in state 810, the memory device can transition to state 820 (e.g., a "manufactured state") by performing operations such as performing operations that cause the operational metric to meet the lock condition, such as writing data to the memory device 100 such that a number of bytes written exceeds a threshold. State 820 is similar to state 815 except that key-modification firmware (and/or other custom firmware in some embodiments) remains enabled in state 820.

If the memory device is in state 815 and the value of the configuration setting is changed (either maliciously by an outside actor, or by the customer), then the memory device moves into a "deployed state" 825 with key-modification firmware disabled. This will occur even if the configuration value is changed to the security key modification value, because the operation metric meets the lock condition (e.g., the total bytes written>given threshold) at the time the configuration value is changed to the security key modification value. This prevents enablement of the key-modification firmware after memory device shipment even for customers who do not lock the configuration after mobile device shipment. In state 825, the configuration may be locked or unlocked.

If the memory device is in state 820 and the value of the configuration setting is changed (either maliciously by an outside actor, or by the customer), then the memory device moves into state 815 and the key-modification firmware is disabled. If the memory device is in state 820 and the configuration of the memory device is locked, then the memory device enters state 830 ("deployed state"). Deployed state 830 differs from deployed state 825 in that the key-modification firmware remains enabled and allows for changing security keys. In other examples, state 830 may disable the key-modification firmware in response to either the lock of the configuration or in response to the operational metric meeting the lock condition. In still other examples, once the configuration is locked, the key-modification firmware may deny any efforts to change the security keys.

As shown in FIG. 8, in order to enable the key-modification firmware, the configuration setting must be set to the Security key modification value prior to the operational metric exceeding the threshold. Once the key-modification firmware is enabled, users may modify the security keys until the key-modification firmware is disabled by changing the configuration setting. While FIG. 8 illustrated a number of state transitions, one of ordinary skill in the art will appreciate that other transitions and/or states may be possible. For example, a transition between states 810 and 815, or the like.

As used herein, the term operational metric may include one or more metrics of the memory device. Example metrics may include a number of bytes written, a number of bytes read, a number of read operations performed, a number of write operations performed, number of power cycles and the like. Example lock conditions may include a threshold number of read or write operations; a threshold number of bytes read or written, or the like. In one example, the operational metric may be a number of bytes written and the lock condition may be that the number of bytes written is greater than zero. Thus, once data is written to the memory device, the operational metric meets the condition (as the number of bytes written exceeds zero) and the key-replacement firmware can no longer be enabled if it had not already been enabled.

Figure 9:
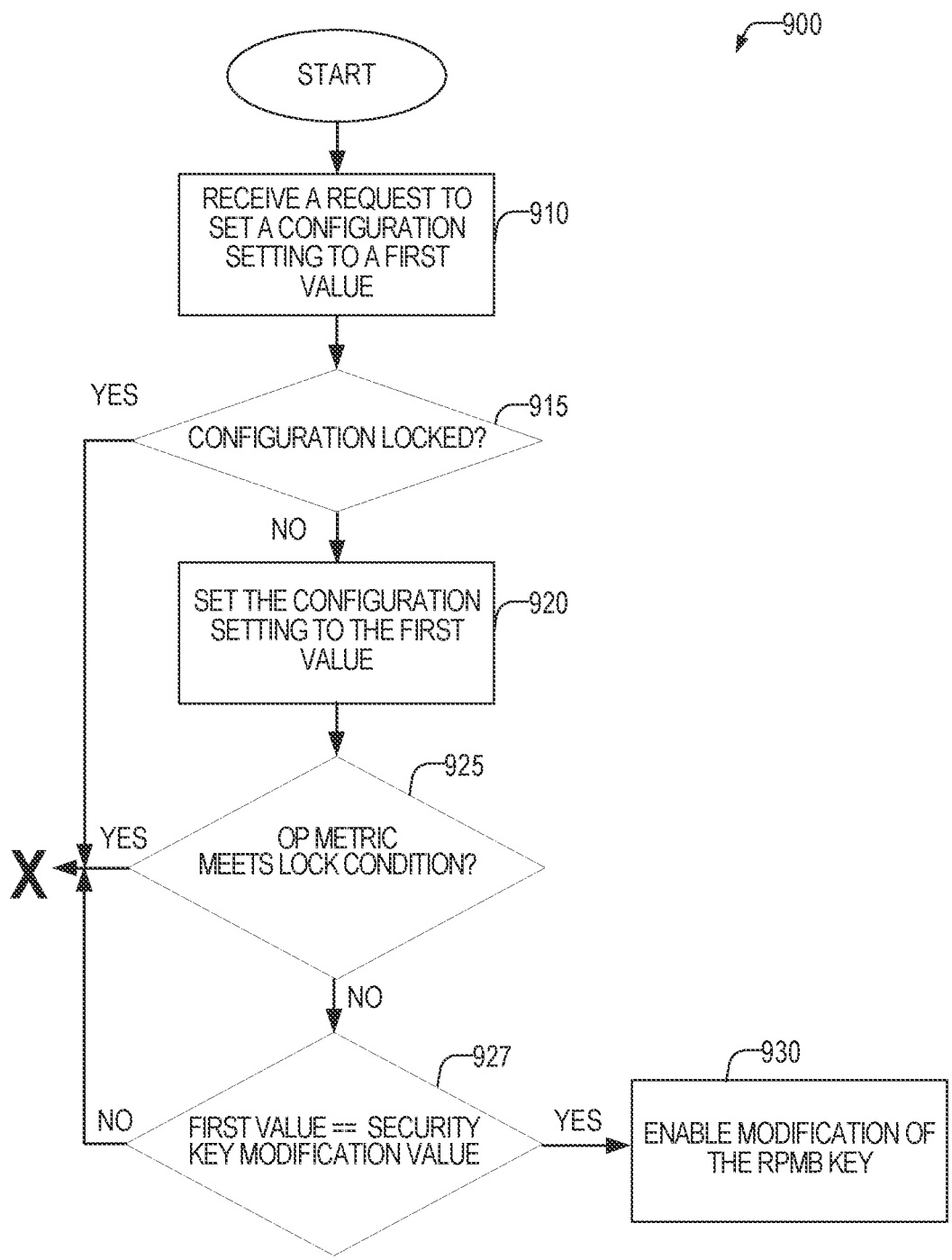
FIG. 9 illustrates a flowchart of a method of enabling a key-modification firmware according to some examples of the present disclosure.

FIG. 9 illustrates a flowchart of a method 900 of enabling a key-modification firmware according to some examples of the present disclosure. At operation 910, the memory device may receive a request to set a configuration setting to a first value. In some examples, the configuration setting may be an OEM string. At operation 915 a determination is made as to whether the configuration of the device is locked. If at operation 915, the configuration is locked, flow ends and the configuration is not changed. If the configuration is not locked, the configuration setting is set to the first value at operation 920. At operation 925 a determination is made whether the operational metric meets a lock condition. For example, whether a number of bits or bytes read or written meets or exceeds a threshold. In one example, the threshold may be zero. That is, once data is written to the memory device, the ability to enable the key-modification firmware, if not previously done, is terminated. In other examples the operational metric is a number of reads, a number of writes, or other operations. If the operational metric meets the lock condition, then the flow ends and the key-modification firmware is not enabled.

If the operational metric does not meet the lock condition, then the memory device checks at operation 927 to determine if the first value is the security key modification value. If not, then the flow terminates without enabling the key-modification firmware. If the first value is the security key modification value, then at operation 930 the key-modification firmware is enabled and modification of the security key is enabled. While FIG. 9 showed operation 925 occurring prior to operation 927, in other examples, operation 927 may be performed before operation 925.

Figure 10:
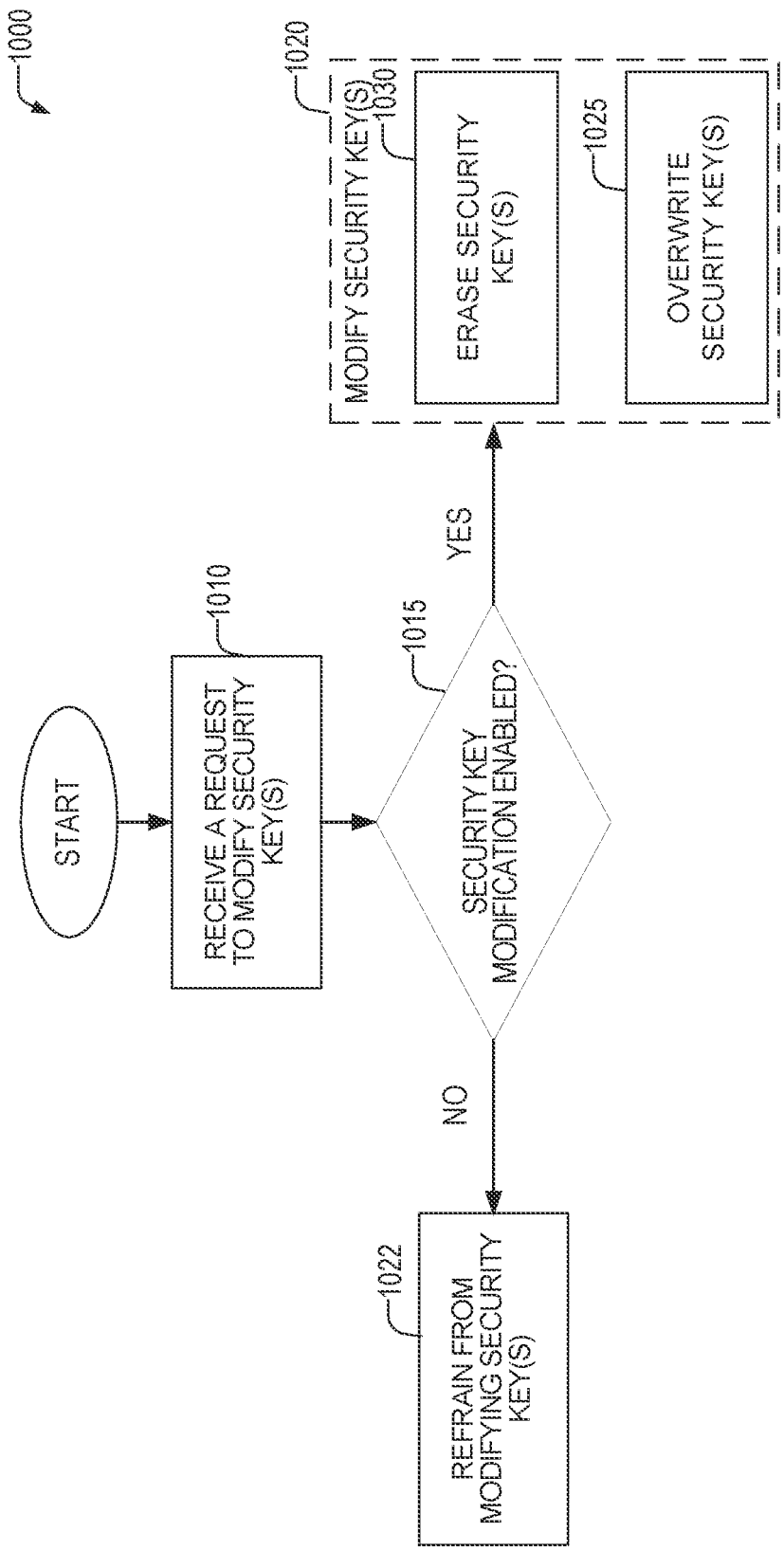
FIG. 10 illustrates a flowchart of a method of updating security keys of a protected portion of a memory device using configuration values according to some examples of the present disclosure.

FIG. 10 illustrates a flowchart of a method 1000 of updating security keys of a protected portion of a memory device using configuration values according to some examples of the present disclosure. Prior to the execution of method 1000, the key-modification firmware is loaded to the memory device using an FFU process. At operation 1010, the memory device receives a request to modify one or more security keys. At operation 1015, the memory device may determine whether the key-modification firmware is enabled. For example, from the method 900. The key-modification firmware may be enabled in states 810, 820 and 830 of FIG. 8.

If the key-modification firmware is enabled, then the one or more security key(s) may be modified at 1020. This may include erasing the security keys 1030 and/or replacing the security keys 1025. If the key-modification firmware is not enabled, then at operation 1022, the security keys are not modified. This may include rejecting the request or taking no action on the request. In some examples, one or more of the operations of method 1000 are performed by the key-modification firmware and/or operational firmware.

Figure 11:
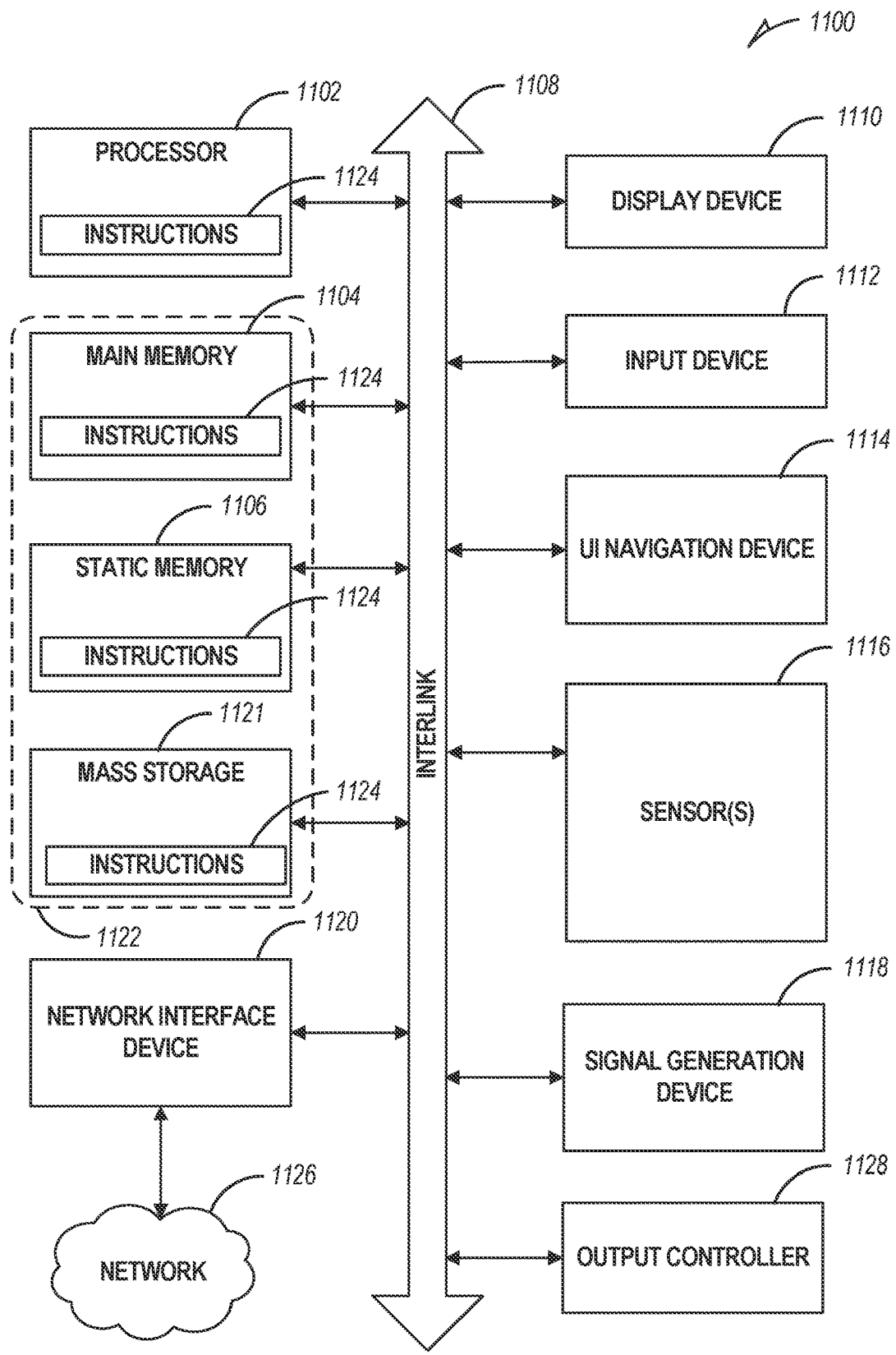
FIG. 11 illustrates a block diagram of an example machine upon which any one or more of the techniques (e.g., methodologies) discussed herein may be performed.

FIG. 11 illustrates a block diagram of an example machine 1100 upon which any one or more of the techniques (e.g., methodologies) discussed herein may be performed. Machine 1100 or one or more components of machine 1100 may implement one or more of the memory devices or components of memory devices described herein. For example, machine 1100 or one or more components of machine 1100 may implement the memory device 100. In some examples, the machine 1100 may be a host device 135. In some examples, main memory 1104, static memory 1106, and/or mass storage 1121 may be implemented through memory such as those discussed relative to FIGS. 1-10 herein.

In alternative embodiments, the machine 1100 can operate as a standalone device or can be connected (e.g., networked) to other machines. In a networked deployment, the machine 1100 can operate in the capacity of a memory device, a host device, a server machine, a client machine, or both in server-client network environments. In an example, the machine 1100 can act as a peer machine in peer-to-peer (P2P) (or other distributed) network environment. The machine 1100 can be a personal computer (PC), a tablet PC, a set-top box (STB), a personal digital assistant (PDA), a mobile telephone, a web appliance, an IoT device, automotive system, a host device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 1100 (e.g., the host device 135, the memory device 100, etc.) can include a hardware processor 1102 (e.g., a central processing unit (CPU), a graphics processing unit (GPU), a hardware processor core, or any combination thereof, etc.), a main memory 1504 and a static memory 1106, some or all of which can communicate with each other via an interlink (e.g., bus) 1108. The machine 1100 can further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 can be a touch screen display. The machine 1100 can additionally include a storage device (e.g., mass storage 1121), a signal generation device 1118 (e.g., a speaker), a network interface device 1120, and one or more sensors 1116, such as a global positioning system (GPS) sensor, compass, accelerometer, or other sensor. The machine 1100 can include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1121 can include a machine readable medium 1122 on which is stored one or more sets of data structures or instructions 1124 (e.g., software) embodying or utilized by any one or more of the techniques or functions described herein. The instructions 1124 can also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1121 can constitute the machine readable medium 1122.

While the machine readable medium 1122 is illustrated as a single medium, the term "machine readable medium" can include a single medium or multiple media (e.g., a centralized or distributed database, or associated caches and servers) configured to store the one or more instructions 1124.

The term "machine readable medium" can include any medium capable of storing, encoding, or carrying instructions for execution by the machine 1100 and that cause the machine 1100 to perform any one or more of the techniques of the present disclosure, or capable of storing, encoding or carrying data structures used by or associated with such instructions. Non-limiting machine readable medium examples can include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 (e.g., software, programs, an operating system (OS), etc.) or other data are stored on the storage device 1121, can be accessed by the memory 1104 for use by the processor 1102. The memory 1104 (e.g., DRAM) is typically fast, but volatile, and thus a different type of storage than the storage device 1121 (e.g., an SSD), which is suitable for long-term storage, including while in an "off" condition. The instructions 1124 or data in use by a user or the machine 1100 are typically loaded in the memory 1104 for use by the processor 1102. When the memory 1104 is full, virtual space from the storage device 1121 can be allocated to supplement the memory 1104; however, because the storage 1121 device is typically slower than the memory 1104, and write speeds are typically at least twice as slow as read speeds, use of virtual memory can greatly reduce user experience due to storage device latency (in contrast to the memory 1104, e.g., DRAM). Further, use of the storage device 1121 for virtual memory can greatly reduce the usable lifespan of the storage device 1121.

In contrast to virtual memory, virtual memory compression (e.g., the Linux® kernel feature "ZRAM") uses part of the memory as compressed block storage to avoid paging to the storage device 1121. Paging takes place in the compressed block until it is necessary to write such data to the storage device 1121. Virtual memory compression increases the usable size of memory 1104, while reducing wear on the storage device 1121.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1124 can further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fie, IEEE 802.16 family of standards known as WiMax®), IEEE 802.15.4 family of standards, peer-to-peer (P2P) networks, among others. In an example, the network interface device 1520 can include one or more physical jacks (e.g., Ethernet, coaxial, or phone jacks) or one or more antennas to connect to the communications network 1126. In an example, the network interface device 1120 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding or carrying instructions for execution by the machine 1100, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, i.e., a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

OTHER NOTES AND EXAMPLES

Example 1 is a memory device, the memory device comprising: a memory array, the memory array comprising a plurality of memory cells, a portion of the memory array being a protected portion accessed using a security key; a controller, the controller configured to perform operations comprising: receiving a request to set a configuration setting of the memory device to a first value; setting the configuration setting of the memory device to the first value; determining whether an operational metric is below a threshold value; responsive to setting the configuration setting of the memory device to the first value and determining that the operational metric is below the threshold value, enabling a security key modification feature; receiving a request to modify the security key for the protected portion; responsive to receiving the request, determining whether the security key modification feature is enabled; and responsive to determining that the security key modification feature is enabled, modifying the security key for the protected portion.

In Example 2, the subject matter of Example 1 includes, wherein the configuration setting is an Original Equipment Manufacturer string attribute.

In Example 3, the subject matter of Examples 1-2 includes, wherein the protected portion comprises a replay protected memory block (RPMB), and wherein the operations further comprise: subsequent to modifying the security key, receiving a request to perform a memory operation on a location of the RPMB, the request including a secret value; determining whether the secret value is an expected secret value based upon the request and the modified security key; and responsive to determining that the secret value is the expected secret value, performing the memory operation on the location of the RPMB.

In Example 4, the subject matter of Examples 1-3 includes, wherein the operations further comprise: responsive to determining that the security key modification feature is not enabled, not modifying the security key for the protected portion.

In Example 5, the subject matter of Examples 1-4 includes, wherein the operations further comprise: receiving a request to set a configuration setting of the memory device to a second value; setting the configuration setting of the memory device to the second value; determining whether the operational metric is below the threshold value; responsive to determining that the operational metric is not below the threshold, and the configuration setting is set to the second value, disabling the security key modification feature; receiving a second request to modify the security key for the protected portion; responsive to receiving the second request, determining whether the security key modification feature is enabled; and responsive to determining that the security key modification feature is disabled, refraining from modifying the security key for the protected portion.

In Example 6, the subject matter of Examples 1-5 includes, wherein the operations further comprise: receiving a request to lock the configuration of the memory device; locking the configuration of the memory device; receiving a request to modify the configuration setting to a second value different than the first value; determining whether the configuration of the memory device is locked; and responsive to determining that the configuration of the memory device is locked, refraining from changing the first value of the configuration setting to the second value.

In Example 7, the subject matter of Examples 1-6 includes, wherein the plurality of memory cells are NAND memory cells.

Example 8 is a method comprising: at a memory device: receiving a request to set a configuration setting of the memory device to a first value; setting the configuration setting of the memory device to the first value; determining whether an operational metric is below a threshold value; responsive to setting the configuration setting of the memory device to the first value and determining that the operational metric is below the threshold value, enabling a security key modification feature; receiving a request to modify a security key for a protected portion of a memory array of the memory device; responsive to receiving the request, determining whether the security key modification feature is enabled; and responsive to determining that the security key modification feature is enabled, modifying the security key for the protected portion.

In Example 9, the subject matter of Example 8 includes, wherein the configuration setting is an Original Equipment Manufacturer string attribute.

In Example 10, the subject matter of Examples 8-9 includes, wherein the protected portion comprises a replay protected memory block (RPMB), and wherein the operations further comprise: subsequent to modifying the security key, receiving a request to perform a memory operation on a location of the RPMB, the request including a secret value; determining whether the secret value is an expected secret value based upon the request and the modified security key; and responsive to determining that the secret value is the expected secret value, performing the memory operation on the location of the RPMB.

In Example 11, the subject matter of Examples 8-10 includes, wherein the operations further comprise: responsive to determining that the security key modification feature is not enabled, not modifying the security key for the protected portion.

In Example 12, the subject matter of Examples 8-11 includes, wherein the operations further comprise: receiving a request to set a configuration setting of the memory device to a second value; setting the configuration setting of the memory device to the second value; determining whether the operational metric is below the threshold value; responsive to determining that the operational metric is not below the threshold, and the configuration setting is set to the second value, disabling the security key modification feature; receiving a second request to modify the security key for the protected portion; responsive to receiving the second request, determining whether the security key modification feature is enabled; and responsive to determining that the security key modification feature is disabled, refraining from modifying the security key for the protected portion.

In Example 13, the subject matter of Examples 8-12 includes, wherein the operations further comprise: receiving a request to lock the configuration of the memory device; locking the configuration of the memory device; receiving a request to modify the configuration setting to a second value different than the first value; determining whether the configuration of the memory device is locked; and responsive to determining that the configuration of the memory device is locked, refraining from changing the first value of the configuration setting to the second value.

In Example 14, the subject matter of Examples 8-13 includes, wherein the plurality of memory cells are NAND memory cells.

Example 15 is a non-transitory machine-readable medium, storing instructions, which when executed by a controller of a memory device, cause the memory device to perform operations comprising: receiving a request to set a configuration setting of the memory device to a first value; setting the configuration setting of the memory device to the first value; determining whether an operational metric is below a threshold value; responsive to setting the configuration setting of the memory device to the first value and determining that the operational metric is below the threshold value, enabling a security key modification feature; receiving a request to modify a security key for a protected portion of a memory array of the memory device; responsive to receiving the request, determining whether the security key modification feature is enabled; and responsive to determining that the security key modification feature is enabled, modifying the security key for the protected portion.

In Example 16, the subject matter of Example 15 includes, wherein the configuration setting is an Original Equipment Manufacturer string attribute.

In Example 17, the subject matter of Examples 15-16 includes, wherein the protected portion comprises a replay protected memory block (RPMB), and wherein the operations further comprise: subsequent to modifying the security key, receiving a request to perform a memory operation on a location of the RPMB, the request including a secret value; determining whether the secret value is an expected secret value based upon the request and the modified security key; and responsive to determining that the secret value is the expected secret value, performing the memory operation on the location of the RPMB.

In Example 18, the subject matter of Examples 15-17 includes, wherein the operations further comprise: responsive to determining that the security key modification feature is not enabled, not modifying the security key for the protected portion.

In Example 19, the subject matter of Examples 15-18 includes, wherein the operations further comprise: receiving a request to set a configuration setting of the memory device to a second value; setting the configuration setting of the memory device to the second value; determining whether the operational metric is below the threshold value; responsive to determining that the operational metric is not below the threshold, and the configuration setting is set to the second value, disabling the security key modification feature; receiving a second request to modify the security key for the protected portion; responsive to receiving the second request, determining whether the security key modification feature is enabled; and responsive to determining that the security key modification feature is disabled, refraining from modifying the security key for the protected portion.

In Example 20, the subject matter of Examples 15-19 includes, wherein the operations further comprise: receiving a request to lock the configuration of the memory device; locking the configuration of the memory device; receiving a request to modify the configuration setting to a second value different than the first value; determining whether the configuration of the memory device is locked; and responsive to determining that the configuration of the memory device is locked, refraining from changing the first value of the configuration setting to the second value.

In Example 21, the subject matter of Examples 15-20 includes, wherein the plurality of memory cells are NAND memory cells.

Example 22 is a memory device, the memory device comprising: a memory array, the memory array comprising a plurality of memory cells, a portion of the memory array being a protected portion accessed using a security key; a controller, the controller configured to perform operations comprising: means for receiving a request to set a configuration setting of the memory device to a first value; means for setting the configuration setting of the memory device to the first value; means for determining whether an operational metric is below a threshold value; means for, responsive to setting the configuration setting of the memory device to the first value and determining that the operational metric is below the threshold value, enabling a security key modification feature; means for receiving a request to modify the security key for the protected portion; means for, responsive to receiving the request, determining whether the security key modification feature is enabled; and means for, responsive to determining that the security key modification feature is enabled, modifying the security key for the protected portion.

In Example 23, the subject matter of Example 22 includes, wherein the configuration setting is an Original Equipment Manufacturer string attribute.

In Example 24, the subject matter of Examples 22-23 includes, wherein the protected portion comprises a replay protected memory block (RPMB), and wherein the operations further comprise: means for, subsequent to modifying the security key, receiving a request to perform a memory operation on a location of the RPMB, the request including a secret value; means for determining whether the secret value is an expected secret value based upon the request and the modified security key; and means for, responsive to determining that the secret value is the expected secret value, performing the memory operation on the location of the RPMB.

In Example 25, the subject matter of Examples 22-24 includes, wherein the operations further comprise: means for, responsive to determining that the security key modification feature is not enabled, not modifying the security key for the protected portion.

In Example 26, the subject matter of Examples 22-25 includes, wherein the operations further comprise: means for receiving a request to set a configuration setting of the memory device to a second value; means for setting the configuration setting of the memory device to the second value; means for determining whether the operational metric is below the threshold value; means for, responsive to determining that the operational metric is not below the threshold, and the configuration setting is set to the second value, disabling the security key modification feature; means for receiving a second request to modify the security key for the protected portion; means for, responsive to receiving the second request, determining whether the security key modification feature is enabled; and means for, responsive to determining that the security key modification feature is disabled, refraining from modifying the security key for the protected portion.

In Example 27, the subject matter of Examples 22-26 includes, wherein the operations further comprise: means for receiving a request to lock the configuration of the memory device; means for locking the configuration of the memory device; means for receiving a request to modify the configuration setting to a second value different than the first value; means for determining whether the configuration of the memory device is locked; and means for, responsive to determining that the configuration of the memory device is locked, refraining from changing the first value of the configuration setting to the second value.

In Example 28, the subject matter of Examples 22-27 includes, wherein the plurality of memory cells are NAND memory cells.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A memory device, the memory device comprising:
    a memory array, the memory array comprising a plurality of memory cells, a portion of the memory array being a protected portion accessed using a security key;
    a controller, the controller configured to perform operations comprising:
    installing a key-modification firmware object received over a network;
    receiving a request to set a configuration setting of the memory device to a first value;
    responsive to receiving the request, determining that the key-modification firmware object corresponds to a standard firmware object already installed on the memory device;
    responsive to determining that the key-modification firmware object corresponds to the standard firmware object already installed on the memory device:
        determining whether the first value corresponds to a prespecified value derived from a device identifier of the memory device; and
        responsive to determining that the first value corresponds to the value derived from the device identifier corresponding to the memory device:
            determining whether an operational metric is below a threshold value;
            responsive to determining whether the operational metric is below the threshold value, setting the configuration setting of the memory device to the first value; and
            responsive to setting the configuration setting of the memory device to the first value and determining that the operational metric is below the threshold value, enabling a security key modification feature;
    receiving a request to modify the security key for the protected portion;
    responsive to receiving the request, determining whether the security key modification feature is enabled; and
    responsive to determining that the security key modification feature is enabled, modifying the security key for the protected portion.

2. The memory device of claim 1, wherein the configuration setting is an Original Equipment Manufacturer string attribute.

3. The memory device of claim 1, wherein the protected portion comprises a replay protected memory block (RPMB), and wherein the operations further comprise:
  subsequent to modifying the security key, receiving a request to perform a memory operation on a location of the RPMB, the request including a secret value;
  determining whether the secret value is an expected secret value based upon the request and the modified security key; and
  responsive to determining that the secret value is the expected secret value, performing the memory operation on the location of the RPMB.

4. The memory device of claim 1, wherein the operations further comprise:
  responsive to determining that the security key modification feature is not enabled, not modifying the security key for the protected portion.

5. The memory device of claim 1, wherein the operations further comprise:
  receiving a request to set a configuration setting of the memory device to a second value;
  setting the configuration setting of the memory device to the second value;
  determining whether the operational metric is below the threshold value;
  responsive to determining that the operational metric is not below the threshold, and the configuration setting is set to the second value, disabling the security key modification feature;
  receiving a second request to modify the security key for the protected portion;
  responsive to receiving the second request, determining whether the security key modification feature is enabled; and
  responsive to determining that the security key modification feature is disabled, refraining from modifying the security key for the protected portion.

6. The memory device of claim 1, wherein the operations further comprise:
  receiving a request to lock the configuration of the memory device;
  locking the configuration of the memory device;
  receiving a request to modify the configuration setting to a second value different than the first value;
  determining whether the configuration of the memory device is locked; and
  responsive to determining that the configuration of the memory device is locked, refraining from changing the first value of the configuration setting to the second value.

7. The memory device of claim 1, wherein the plurality of memory cells are NAND memory cells.

8. A method comprising:
  at a memory device:
  installing a key-modification firmware object received over a network;
  receiving a request to set a configuration setting of the memory device to a first value;
  responsive to receiving the request, determining that the key-modification firmware object corresponds to a standard firmware object already installed on the memory device;
  responsive to determining that the key-modification firmware object corresponds to the standard firmware object already installed on the memory device:
  determining whether the first value corresponds to a prespecified value derived from a device identifier of the memory device; and
  responsive to determining that the first value corresponds to the value derived from the device identifier corresponding to the memory device:
    determining whether an operational metric is below a threshold value;
    responsive to determining whether the operational metric is below the threshold value, setting the configuration setting of the memory device to the first value; and
    responsive to setting the configuration setting of the memory device to the first value and determining that the operational metric is below the threshold value, enabling a security key modification feature;
  receiving a request to modify a security key for a protected portion of a memory array of the memory device;
  responsive to receiving the request, determining whether the security key modification feature is enabled; and
  responsive to determining that the security key modification feature is enabled, modifying the security key for the protected portion.

9. The method of claim 8, wherein the configuration setting is an Original Equipment Manufacturer string attribute.

10. The method of claim 8, wherein the protected portion comprises a replay protected memory block (RPMB), and wherein the operations further comprise:
  subsequent to modifying the security key, receiving a request to perform a memory operation on a location of the RPMB, the request including a secret value;
  determining whether the secret value is an expected secret value based upon the request and the modified security key; and
  responsive to determining that the secret value is the expected secret value, performing the memory operation on the location of the RPMB.

11. The method of claim 8, wherein the operations further comprise:
  responsive to determining that the security key modification feature is not enabled, not modifying the security key for the protected portion.

12. The method of claim 8, wherein the operations further comprise:
  receiving a request to set a configuration setting of the memory device to a second value;
  setting the configuration setting of the memory device to the second value;
  determining whether the operational metric is below the threshold value;
  responsive to determining that the operational metric is not below the threshold, and the configuration setting is set to the second value, disabling the security key modification feature;
  receiving a second request to modify the security key for the protected portion;
  responsive to receiving the second request, determining whether the security key modification feature is enabled; and
  responsive to determining that the security key modification feature is disabled, refraining from modifying the security key for the protected portion.

13. The method of claim 8, wherein the operations further comprise:
- receiving a request to lock the configuration of the memory device;
- locking the configuration of the memory device;
- receiving a request to modify the configuration setting to a second value different than the first value;
- determining whether the configuration of the memory device is locked; and
- responsive to determining that the configuration of the memory device is locked, refraining from changing the first value of the configuration setting to the second value.

14. The method of claim 8, wherein the plurality of memory cells are NAND memory cells.

15. A non-transitory machine-readable medium, storing instructions, which when executed by a controller of a memory device, cause the memory device to perform operations comprising:
- installing a key-modification firmware object received over a network;
- receiving a request to set a configuration setting of the memory device to a first value;
- responsive to receiving the request, determining that the key-modification firmware object corresponds to a standard firmware object already installed on the memory device;
- responsive to determining that the key-modification firmware object corresponds to the standard firmware object already installed on the memory device:
  - determining whether the first value corresponds to a prespecified value derived from a device identifier of the memory device; and
  - responsive to determining that the first value corresponds to the value derived from the device identifier corresponding to the memory device:
    - determining whether an operational metric is below a threshold value;
    - responsive to determining whether the operational metric is below the threshold value, setting the configuration setting of the memory device to the first value; and
    - responsive to setting the configuration setting of the memory device to the first value and determining that the operational metric is below the threshold value, enabling a security key modification feature;
- receiving a request to modify a security key for a protected portion of a memory array of the memory device;
- responsive to receiving the request, determining whether the security key modification feature is enabled; and
- responsive to determining that the security key modification feature is enabled, modifying the security key for the protected portion.

16. The non-transitory machine-readable medium of claim 15, wherein the configuration setting is an Original Equipment Manufacturer string attribute.

17. The non-transitory machine-readable medium of claim 15, wherein the protected portion comprises a replay protected memory block (RPMB), and wherein the operations further comprise:
- subsequent to modifying the security key, receiving a request to perform a memory operation on a location of the RPMB, the request including a secret value;
- determining whether the secret value is an expected secret value based upon the request and the modified security key; and
- responsive to determining that the secret value is the expected secret value, performing the memory operation on the location of the RPMB.

18. The non-transitory machine-readable medium of claim 15, wherein the operations further comprise:
- responsive to determining that the security key modification feature is not enabled, not modifying the security key for the protected portion.

19. The non-transitory machine-readable medium of claim 15, wherein the operations further comprise:
- receiving a request to set a configuration setting of the memory device to a second value;
- setting the configuration setting of the memory device to the second value;
- determining whether the operational metric is below the threshold value;
- responsive to determining that the operational metric is not below the threshold, and the configuration setting is set to the second value, disabling the security key modification feature;
- receiving a second request to modify the security key for the protected portion;
- responsive to receiving the second request, determining whether the security key modification feature is enabled; and
- responsive to determining that the security key modification feature is disabled, refraining from modifying the security key for the protected portion.

20. The non-transitory machine-readable medium of claim 15, wherein the operations further comprise:
- receiving a request to lock the configuration of the memory device;
- locking the configuration of the memory device;
- receiving a request to modify the configuration setting to a second value different than the first value;
- determining whether the configuration of the memory device is locked; and
- responsive to determining that the configuration of the memory device is locked, refraining from changing the first value of the configuration setting to the second value.

* * * * *